United States Patent [19]

Irvine

[11] 3,894,008
[45] July 8, 1975

[54] 2-IMIDAZOLIN-5-ONES
[75] Inventor: John L. Irvine, West Allis, Wis.
[73] Assignee: Colgate-Palmolive Company, New York, N.Y.
[22] Filed: May 31, 1974
[21] Appl. No.: 475,049

[52] U.S. Cl....... 260/240 A; 260/240 D; 260/240 E; 260/309.6; 260/347.8; 424/273
[51] Int. Cl.......................... C07d 5/04; C07d 49/36
[58] Field of Search......... 260/240 A, 240 D, 240 E

[56] References Cited
FOREIGN PATENTS OR APPLICATIONS
1,176,660   7/1963   Germany OTHER PUBLICATIONS
Edwards et al., J. Hetero. Chem 9(2) p. 363–369.

Primary Examiner—Arthur P. Demers
Attorney, Agent, or Firm—T. F. Kryshak; M. L. Youngs

[57] ABSTRACT

The compounds are 2-imidazolin-5-ones which are central nervous system depressants, sedatives and antipsychotic agents. Representative of the compounds disclosed are: 1-methyl-4,4-diphenyl-2[2-(2-pyridyl)vinyl]-2-imidazolin-5-one; 4,4-diphenyl-2-[1-(4-phenyl-1,3-butadienyl]-1-o-tolyl-2-imidazolin-5-one; and 1-(2-methylphenyl)-2-[2-{5-(4-nitrophenyl)-2-furanyl}-ethenyl]-4,4-diphenyl-2-imidazolin-5-one.

9 Claims, No Drawings

2-IMIDAZOLIN-5-ONES

BACKGROUND OF THE INVENTION

The compounds of the present invention are novel. However, some of the intermediates employed in preparing the compounds, namely the triarylimidazolin-5-ones, are disclosed in German Pat. Nos. 1,165,660 and 1,258,412.

DETAILED DESCRIPTION

The compounds of the present invention may be represented by the following formula:

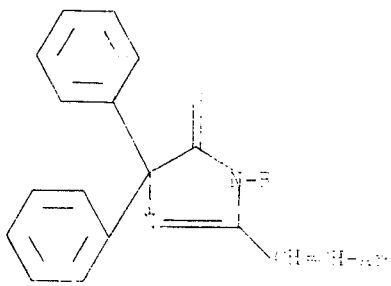

in which R is a lower alkyl of 1 to 4 carbon atoms, such as methyl, ethyl or isopropyl, phenyl or substituted phenyl or tolyl, and Ar is selected from phenyl, pyridyl,

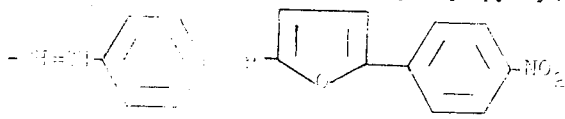

In the preferred practice of the invention the novel compounds are prepared by reacting a suitable imidazolin-5-one with a selected aldehyde under conventional condensation reaction conditions. The process which is described is illustrated in the examples and may be diagrammed as follows:

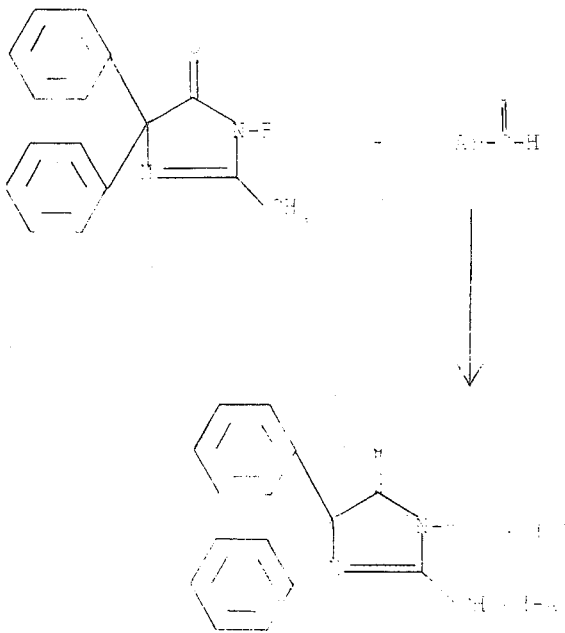

in which R and Ar are as previously defined.

Representative of the imidazolin-5-ones which may be employed are the following:
2-Methyl-4,4-diphenyl-1-o-tolyl-2-imidazolin-5-one,
2-Methyl-1,4,4-triphenyl-2-imidazolin-5-one, and
1,2-Dimethyl-4,4-diphenyl-2-imidazolin-5-one.

Representative of the aldehydes which may be employed are the following:
Benzaldehyde,
Pyridine-2-carboxaldehyde,
Pyridine-3-carboxaldehyde,
Cinnaminaldehyde,
5-(4-Nitrophenyl)-2-furaldehyde, and
p-Chlorobenzaldehyde.

Representative of the final compounds which may be prepared by the described process are the following:
4,4-Diphenyl-2-styryl-1-o-tolyl-2-imidazolin-5-one,
4,4-Diphenyl-2-[(2-pyridyl)vinyl]-1-o-tolyl-2-imidazolin-5-one,
4,4-Diphenyl-2-[1-(4-phenyl-1,3-butadienyl]-1-o-tolyl-2-imidazolin-5-one,
2-[2-{5-(4-Nitrophenyl)-2-furanyl}vinyl]-4,4-diphenyl-1-o-tolyl-2-imidazolin-5-one, and
1-Methyl-4,4-diphenyl-2[2-(2-pyridyl)vinyl]-2-imidazolin-5-one.

The novel compounds of the present invention may be used as intermediates in the preparation of more complex chemical and pharmaceutical compounds. In addition, they are useful as pharmaceutical agents per se because of their antipsychotic properties, especially their ability to inhibit antisocial behavior.

The following compounds possess the activity to decrease or inhibit antisocial behavioral characteristics such as aggressiveness, viciousness and persistance for fighting induced by isolation in mice, when administered to the mice in safe and effective doses of approximately 100 mg/kg intraperitoneally:
4,4-Diphenyl-2-styryl-1-o-tolyl-2-imidazolin-5-one,
4,4-Diphenyl-2-[(2-pyridyl)vinyl]-1-o-tolyl-2-imidazolin-5-one,
4,4-Diphenyl-2-[1-(4-phenyl)-1,3-butadienyl]-1-o-tolyl-2-imidazolin-5-one,
2-[2-{5-(4-Nitrophenyl)-2-furanyl}vinyl]-4,4-diphenyl-1-o-tolyl-2-imidazolin-5-one, and
1-Methyl-4,4-diphenyl-2[2-(2-pyridyl)vinyl]-2-imidazolin-5-one.

In animal behavioral studies, the previously named compounds exhibited a central nervous system depressant activity which suggests sedative activity. In mice receiving 100 to 300 mg/kg of the compounds intraperitoneally in the form of a 5% acacia suspension, decreased alertness, reactivity, struggle response and other behavioral characteristics of central nervous system depression and sedative activity were observed. As a result of the behavioral studies, the compounds were found to have $LD_{50}$ values in excess of 500 mg/kg intraperitoneally. The behavioral studies were conducted in accordance with the procedure set forth by Irwin in "Animal and Clinical Pharmacologic Techniques in Drug Evaluation", J. H. Nodine and P. E. Siegler, Ed., Year Book Publishers, Inc., 1964, pp. 36–54.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water, a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents, and the like, may also be employed.

The unit dosage forms may contain a concentration of 0.1% to 10% or more by weight of one or more of the novel compounds. Generally, such dosage forms will contain about 50 to 500 mg. of the active ingredients. One or more of such dosage forms may be administered daily. In actual practice, the amount of drug required to produce the desired effect will, of course, vary considerably because of patient differences.

The following examples are presented to illustrate the invention:

EXAMPLE 1

N-Acetyl-2,2-diphenylglycine

To a slurry of 198 g. (0.87 mole) of benzilic acid in one liter of acetonitrile is added 150 ml. of concentrated $H_2SO_4$ over 1 hour. The warm, pink solution is poured onto ice and diluted to 4 liters. The white solid that forms is collected and dried to yield 218 g. (90%) of N-acetyl-2,2-diphenylglycine, m.p. 225° (dec.).

EXAMPLE 2

2-Methyl-4,4-diphenyl-1-o-tolyl-2-imidazolin-5-one

To 70 g. (0.26 mole) of N-acetyl-2,2-diphenylglycine in 600 ml. toluene is added 15.3 ml. $PCl_3$ over 5 minutes at room temperature. After the addition of $PCl_3$, the mixture is stirred 1 hour before 55.5 g. o-toluidine in 150 ml. toluene is added over 30 minutes. The mixture is refluxed 8 hours and stirred at room temperature overnight. Careful addition of 50 ml. $H_2O$ causes the orange material present to clump sufficiently so that the toluene can be decanted and the orange material can be washed with benzene. The orange material, after washing thoroughly with water, was boiled with 600 ml. ethanol and filtered while hot. After cooling, white solid is collected from the ethanol solution to give 2-methyl-4,4-diphenyl-1-o-tolyl-2-imidazolin-5-one, m.p. 139°–141°.

EXAMPLE 3

4,4-Diphenyl-2-styryl-1-o-tolyl-2-imidazolin-5-one

To 6.8 g. (0.02 mole) 2-methyl-4,4-diphenyl-1-o-tolyl-2-imidazolin-5-one in 20 ml. glacial acetic acid and 10 ml. acetic anhydride is added 2.6 g. (0.03 mole) of benzaldehyde. The mixture is refluxed 4 hours, then poured onto ice and diluted to 500 ml. with water. The product is purified by chromatography over 200–250 g. silica gel using benzene as the eluent. A solid product, 4,4-diphenyl-2-styryl-1-o-tolyl-2-imidazolin-5-one, is obtained, m.p. 156°–158°.

Anal. Calcd. for $C_{30}H_{24}N_2O$: C, 84.18; H, 5.65; N, 6.55.

Found: C, 84.12; H, 5.72; N, 6.50.

EXAMPLE 4

4,4-Diphenyl-2-[(2-pyridyl)vinyl]-1-o-tolyl-2-imidazolin-5-one

A mixture of 6.8 g. (0.02 mole) 2-methyl-4,4-diphenyl-1-o-tolyl-2-imidazolin-5-one, 2.6 g. (0.03 mole) pyridine-2-carboxaldehyde, 100 ml. toluene, and 0.85 g. piperidine are refluxed for 2 hours. The toluene is stripped and the semi-solid residue solidified with ethanol. The 6.5 g. of product are recrystallized from 200 ml. ethanol to give 4,4-diphenyl-2-[(2-pyridyl)vinyl]-1-o-tolyl-2-imidazolin-5-one as a pale yellow solid, m.p. 177°–179°.

EXAMPLE 5

4,4-Diphenyl-2-[1-(4-phenyl)-1,3-butadienyl]-1-o-tolyl-2-imidazolin-5-one

The method of Example 4 is repeated using 6.8 g. (0.02 mole) 2-methyl-4,4-diphenyl-1-o-tolyl-2-imidazolin-5-one, 4.0 g. (0.03 mole) cinnaminaldehyde, and 0.5 ml. piperidine, which are allowed to reflux in 50 ml. toluene for 6 hours. An analogous work-up with methanol gives 3 g. solid. Recrystallization from 250 ml. methanol gives 4,4-diphenyl-2-[1-(4-phenyl)-1,3-butadienyl]-1-o-tolyl-2-imidazolin-5-one, m.p. 178°–180°.

Anal. Calcd. for $C_{37}H_{26}N_2O$: C, 84.65; H, 5.77; N, 6.17.

Found: C, 84.61; H, 6.02; N, 6.03.

EXAMPLE 6

2-[2-[5-(4-Nitrophenyl)-2-furanyl]vinyl]-4,4-diphenyl-1-o-tolyl-2-imidazolin-5-one A mixture of 6.8 g. (0.02 mole) 2-methyl-4,4-diphenyl-1-o-tolyl-2-imidazolin-5-one, 6.5 g. (0.03 mole) 5-(4-nitrophenyl)-2-furaldehyde, 100 ml. toluene, and 0.5 ml. piperidine are refluxed 6 hours and left to stand overnight. The solvent is stripped and the residue solidified with ethanol. Recrystallization from acetonitrile gives 2-[2-[5-(4-nitrophenyl)-2-furanyl]vinyl]-4,4-diphenyl-1-o-tolyl-2-imidazolin-5-one.

Anal. Calcd. for $C_{34}H_{25}N_3O_4$: C, 75.69; H, 4.67; N, 7.78.

Found: C, 75.70, 75.69; H, 4.71, 4.73; N, 7.85.

EXAMPLE 7

2-Methyl-4,4-diphenyl-2-oxazolin-5-one

A mixture of 60 g. of N-acetyl-2,2-diphenylglycine in 200 ml. acetic anhydride is heated on the steambath until all the solid has dissolved and then for 30 additional minutes. The mixture is poured onto 1 kg. ice and lumps of white solid are collected. After the lumps are broken, the product is washed with dilute base and filtered to give 2-methyl-4,4-diphenyl-2-oxazolin-5-one.

Anal. Calcd. for $C_{16}H_{13}NO_2$: C, 76.56; H, 5.22; N, 5.60.

Found: C, 76.57, 76.55; H, 5.25, 5.24; N, 5.53.

EXAMPLE 8

N-Acetyl-2,2-diphenylglycinamide

2-Methyl-4,4-diphenyl-2-oxazolin-5-one (38 g.) is stirred for 2 hours at room temperature with 500 ml. concentrated ammonium hydroxide. Filtration and water washing gives N-acetyl-2,2-diphenylglycinamide, m.p. 184°–186°.

EXAMPLE 9

2-Methyl-4,4-diphenyl-2-imidazolin-5-one

N-acetyl-2,2-diphenylglycinamide (32.5 g.) is stirred in 200 ml. phenyl ether and heated to 180° for 2.5 hours. Cooling to room temperature and filtration gives a white powder, m.p. 160°–180°. Two recrystallizations from absolute ethanol give 2-methyl-4,4-diphenyl-2-imidazolin-5-one, m.p. 210°–212°.

Anal. Calcd. for $C_{16}H_{14}N_2$: C, 76.86; H, 5.64; N, 11.21.

Found: C, 76.70; H, 5.78; N, 11.14.

EXAMPLE 10

1,2-Dimethyl-4,4-diphenyl-2-imidazolin-5-one

To 100 ml. absolute ethanol in which 1.82 g. (80 mM) sodium has been dissolved is added 19 g. (76 mM) 2-methyl-4,4-diphenyl-2-imidazolin-5-one. When the imidazolinone has completely dissolved, 5 ml. (80 mM) methyl iodide is added and the reaction stirred at room temperature overnight. A small sample is withdrawn and added to $H_2O$ to give a solid which is used to seed the main reaction mix. The solid collected is recrystallized from 50 ml. ethanol to yield 1,2-dimethyl-4,4-diphenyl-2-imidazolin-5-one, m.p. 171°–174°.

Anal. Calcd. for $C_{17}H_{16}N_2O$: C, 77.34; H, 6.11; N, 10.61.

Found: C, 77.26; H, 6.11; N, 10.61.

EXAMPLE 11

1-Methyl-4,4-diphenyl-2[2-(2-pyridyl)vinyl]-2-imidazolin-5-one

A mixture of 5.0 g. (0.02 mole) 1,2-dimethyl-4,4-diphenyl-2-imidazolin-5-one, 2.8 g. pyridine-2-carboxyaldehyde, 0.75 ml. piperidine, and 50 ml. benzene were refluxed for 24 hours. Reaction was not complete so the benzene was stripped and replaced with toluene. The mixture was refluxed 4 hours, cooled, stripped and worked up in the usual manner to give 3 g. solid. Recrystallization from 75 ml. methanol gave 2.7 g. of 1-methyl-4,4-diphenyl-2[2-(2-pyridyl)vinyl]-2-imidazolin-5-one, m.p. 178°–180°.

Anal. Calcd. for $C_{23}H_{19}N_3O$: C, 78.24; H, 5.43; N, 11.90.

Found: C, 78.09; H, 5.42; N, 11.94.

I claim:

1. A compound of the formula

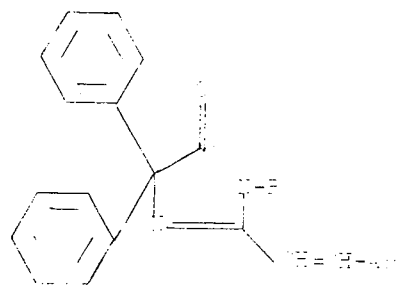

in which R is a lower alkyl of 1 to 4 carbon atoms, phenyl, halo-substituted phenyl or tolyl, and Ar is phenyl, halo-substituted phenyl, pyridyl,

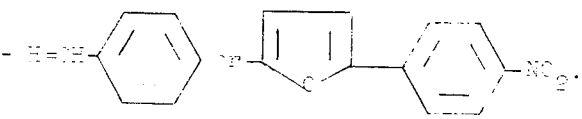

2. A compound of claim 1 in which R is lower alkyl.
3. A compound of claim 1 in which R is methyl.
4. A compound of claim 1 in which R is tolyl.
5. The compound of claim 1 which is 4,4-diphenyl-2-styryl-1-o-tolyl-2-imidazolin-5-one.
6. The compound of claim 1 which is 4,4-diphenyl-2-[(2-pyridyl)vinyl]-1-o-tolyl-2-imidazolin-5-one.
7. The compound of claim 1 which is 4,4-diphenyl-2-[1-(4-phenyl)-1,3-butadienyl]-1-o-tolyl-2-imidazolin-5-one.
8. The compound of claim 1 which is 2-[2-{5-(4-nitrophenyl)-2-furanyl}vinyl]-4,4-diphenyl-1-o-tolyl-2-imidazolin-5-one.
9. The compound of claim 1 which is 1-methyl-4,4-diphenyl-2[2-(2-pyridyl)vinyl]-2-imidazolin-5-one.

* * * * *